United States Patent
Zhang et al.

(10) Patent No.: US 8,805,208 B2
(45) Date of Patent: Aug. 12, 2014

(54) SYSTEM AND METHOD FOR POLARIZATION DE-MULTIPLEXING IN A COHERENT OPTICAL RECEIVER

(75) Inventors: Hongbin Zhang, Marlboro, NJ (US); Oleg Sinkin, Long Branch, NJ (US)

(73) Assignee: Tyco Electronics Subsea Communications LLC, Eatontown, NJ (US)

( * ) Notice: Subject to any disclaimer, the term of this patent is extended or adjusted under 35 U.S.C. 154(b) by 41 days.

(21) Appl. No.: 13/365,759

(22) Filed: Feb. 3, 2012

(65) Prior Publication Data

US 2013/0202021 A1     Aug. 8, 2013

(51) Int. Cl.
*H04B 10/06*     (2006.01)

(52) U.S. Cl.
USPC .......................................... 398/208; 398/202

(58) Field of Classification Search
USPC ......................................................... 398/202
See application file for complete search history.

(56) References Cited

U.S. PATENT DOCUMENTS

| | | | |
|---|---|---|---|
| 6,314,134 B1 * | 11/2001 | Werner et al. ................. | 375/232 |
| 8,260,153 B2 * | 9/2012 | Xie ............................... | 398/202 |
| 8,270,847 B2 * | 9/2012 | Zhang et al. ................. | 398/183 |
| 8,335,440 B2 * | 12/2012 | Krause et al. ................ | 398/208 |
| 8,457,504 B2 * | 6/2013 | Hueda et al. ................. | 398/208 |
| 8,478,135 B2 * | 7/2013 | Xie ............................... | 398/208 |
| 8,606,118 B2 * | 12/2013 | Hatae et al. .................. | 398/202 |
| 8,693,898 B2 * | 4/2014 | Koizumi et al. .............. | 398/208 |
| 2007/0285315 A1 * | 12/2007 | Davis et al. .................. | 342/377 |
| 2008/0152361 A1 * | 6/2008 | Chen et al. ................... | 398/205 |
| 2010/0028011 A1 * | 2/2010 | Kaneda et al. ................ | 398/115 |
| 2011/0064421 A1 * | 3/2011 | Zhang et al. ................. | 398/208 |
| 2011/0142449 A1 * | 6/2011 | Xie ................................ | 398/65 |
| 2011/0243575 A1 * | 10/2011 | Yan et al. ..................... | 398/205 |
| 2011/0293589 A1 * | 12/2011 | Castelli et al. ............... | 424/94.1 |
| 2012/0002979 A1 * | 1/2012 | Xie ............................... | 398/208 |
| 2012/0134676 A1 * | 5/2012 | Kikuchi ........................ | 398/65 |
| 2013/0170842 A1 * | 7/2013 | Koike-Akino et al. ....... | 398/208 |
| 2014/0086594 A1 * | 3/2014 | Xie et al. ...................... | 398/208 |
| 2014/0093255 A1 * | 4/2014 | Liu et al. ...................... | 398/208 |

FOREIGN PATENT DOCUMENTS

WO     2010/136068 A1     12/2010

OTHER PUBLICATIONS

Kikuchi, "Performance analyses of polarization demultiplexing based on constant-modulus algorithm in digital coherent optical receivers" May 9, 2011 / vol. 19, No. 10 / Optics Express pp. 9868-9880.

Savory, et al., "Electronic compensation of chromatic dispersion using a digital coherent receiver," Mar. 5, 2007 / vol. 15, No. 5 / Optics Express pp. 2120-2126.

Savory, et al., "Digital Equalisation of 40Gbit/s per Wavelength Transmission over 2480km of Standard Fibre without Optical Dispersion Compensation," European Conference on Optical Communications, 2006; date of Conference: Sep. 24-28, 2006 (2 pages).

Savory, "Digital filters for coherent optical receivers," Jan. 21, 2008 / vol. 16, No. 2 / Optics Express pp. 804-817.

(Continued)

*Primary Examiner* — Ken Vanderpuye
*Assistant Examiner* — Amritbir Sandhu (57) ABSTRACT

A system and method for polarization de-multiplexing in a coherent optical receiver. De-multiplexing is achieved using a modified constant modulus algorithm (CMA) wherein filter coefficients are determined as a function of a coupling coefficient to avoid convergence of the CMA outputs.

20 Claims, 7 Drawing Sheets

(56) References Cited

OTHER PUBLICATIONS

Petrou, et al., "Quadrature Imbalance Compensation for PDM QPSK Coherent Optical Systems," IEEE Photonics Technology Letters, vol. 21, No. 24, Dec. 15, 2009 pp. 1876-1878.

Kuschnerov, et al., "DSP for Coherent Single-Carrier Receivers," Journal of Lightwave Technology, vol. 27, No. 16, Aug. 15, 2009 pp. 3614-3622.

International Search Report issued in corresponding application No. PCT/US2013/021696 issued on Jun. 4, 2013.

* cited by examiner

SYSTEM AND METHOD FOR POLARIZATION DE-MULTIPLEXING IN A COHERENT OPTICAL RECEIVER

CROSS-REFERENCE TO RELATED APPLICATIONS

Not applicable.

TECHNICAL FIELD

The present application relates to the optical transmission of information and, more particularly, to a system and method for polarization de-multiplexing in a coherent optical receiver.

BACKGROUND

In wavelength division multiplexed (WDM) optical communication systems, a number of different optical carrier wavelengths are separately modulated with data to produce modulated optical signals. The modulated optical signals are combined into an aggregate signal and transmitted over an optical transmission path to a receiver. The receiver detects and demodulates the data.

One data modulation scheme used in optical communication systems is phase-shift keying (PSK). In a PSK modulation scheme, the phase of an optical carrier is modulated such that the phase or phase transition of the optical carrier represents symbols encoding one or more bits. A variety of PSK schemes are well-known. In a binary phase-shift keying (BPSK) modulation scheme, for example, two phases may be used to represent 1 bit per symbol. In a quadrature phase-shift keying (QPSK) modulation scheme, four phases may be used to encode 2 bits per symbol. Other phase shift keying formats include differential phase shift keying (DPSK) formats and variations of phase shift keying and differential phase shift keying formats, such as return-to-zero DPSK (RZ-DPSK).

Polarization multiplexing (POLMUX) may be implemented with a PSK modulation format to double the spectral efficiency of the format. In a POLMUX format, two relatively orthogonal states of polarization of the optical carrier are separately modulated with data, e.g. using a PSK modulation format, and then combined for transmission. For example, in a POLMUX-QPSK signal, orthogonal polarizations of the same optical carrier are modulated with different data streams using a QPSK modulation format.

During transmission of the modulated signals over the transmission path, non-linearities in the path may introduce transmission impairments, such as chromatic dispersion (CD), polarization mode dispersion (PMD) and polarization dependent loss (PDL), into the signals. In general, chromatic dispersion is a differential delay in propagation of different wavelengths through the transmission path, and polarization mode dispersion is a differential delay in propagation of different polarizations through the transmission path. Polarization dependent loss is a differential attenuation for different polarizations through an optical path.

At the receiver, coherent detection with polarization diversity may be used to detect POLMUX-PSK modulated optical signals. In the coherent receiver, the incoming signal from the transmission path has an arbitrary state of polarization (SOP) that is separated into linear x- and y-polarization components with a polarization beam splitter (PBS) and each of the components is mixed with a linearly polarized local oscillator (LO) to measure the complex amplitudes of the x- and y-components. However, in a POLMUX system, each of the outputs of the polarization-diversity coherent receiver includes both of the polarizations on which data is modulated, i.e. the electrical output of the receiver is still polarization multiplexed.

Digital signal processing (DSP) may be applied to the outputs of the coherent receiver to de-multiplex the POL-MUX signals, compensate for transmission impairments such as PMD, PDL and other residual impairments, and demodulate the data. It is known to perform polarization de-multiplexing in DSP using a two-by-two matrix and a constant modulus algorithm (CMA). In general, the CMA uses the assumption that the signal has a constant modulus (i.e. amplitude for a PSK signal) to filter the digitized versions of signals using the input to the CMA and feedback from the output of the CMA to provide outputs representing the data modulated on each of the respective data modulated polarizations of the transmitted signals.

One known disadvantage of using a CMA in this application is that the outputs of the CMA may converge together, even though the inputs to the CMA are different. This convergence is sometimes referred to as the "singularity problem." A discussion of CMA convergence is discussed, for example, in *Performance Analysis of Polarization Demultiplexing Based on Constant-Modulus Algorithm in Digital Coherent Receivers* by Kikuchi, published in Optics Express, vol. 19, No. 10, pp 9868-9880, May 9, 2011, which indicates that convergence can be avoided by applying unitary constraint in the CMA. Unfortunately, applying a unitary constraint in the CMA results in a performance penalty, especially with the presence of PDL and high order PMD.

BRIEF DESCRIPTION OF THE DRAWINGS

Reference should be made to the following detailed description which should be read in conjunction with the following figures, wherein like numerals represent like parts.

DETAILED DESCRIPTION

In general, a system consistent with the present disclosure implements a modified constant modulus algorithm with an additional coupling coefficient for calculating sub-equalizer filter coefficients. The coupling coefficient may be dynamically adjusted in response to the value of a CMA matrix determinant. The modified CMA avoids the convergence or "singularity problem" while exhibiting strong performance, especially when the coupling coefficient is weak, e.g. about $10^{-2}$ or less.

Figure 1:
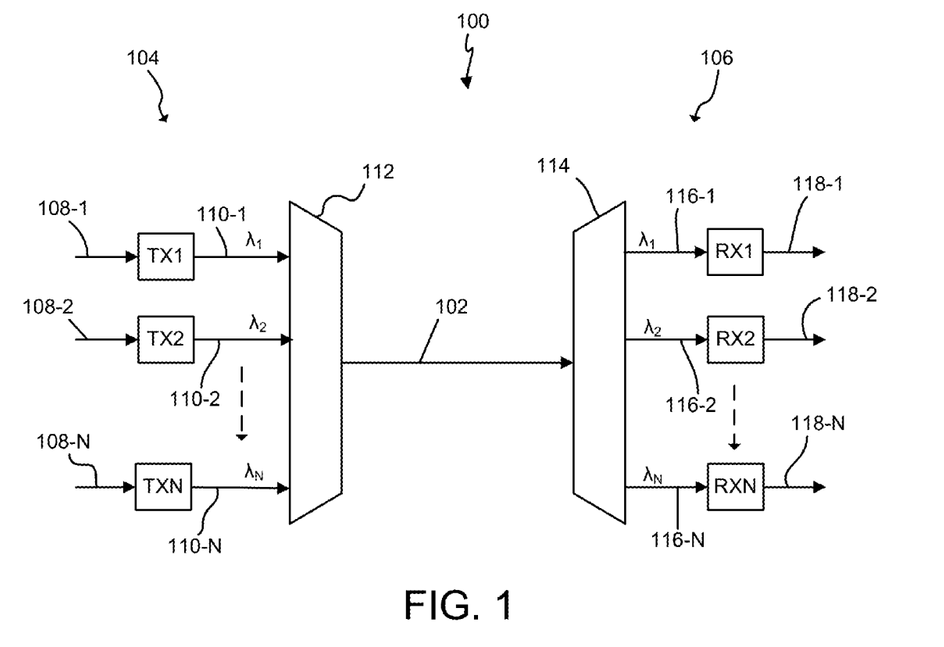
FIG. 1 is a block diagram of one exemplary embodiment of a system consistent with the present disclosure.

FIG. 1 is a simplified block diagram of one exemplary embodiment of a WDM transmission system 100 consistent with the present disclosure. The transmission system serves to transmit a plurality of optical channels over an optical information path 102 from a transmitting terminal 104 to one or more remotely located receiving terminals 106. The exemplary system 100 may be a long-haul submarine system configured for transmitting the channels from a transmitter to a receiver at a distance of 5,000 km, or more. Although exemplary embodiments are described in the context of an optical system and are useful in connection with a long-haul WDM optical system, the broad concepts discussed herein may be implemented in other communication systems transmitting and receiving other types of signals.

Those skilled in the art will recognize that the system 100 has been depicted as a highly simplified point-to-point system for ease of explanation. For example, the transmitting terminal 104 and receiving terminal 106 may, of course, both be configured as transceivers, whereby each may be configured to perform both transmitting and receiving functions. For ease of explanation, however, the terminals are depicted and described herein with respect to only a transmitting or receiving function. It is to be understood that a system and method consistent with the disclosure may be incorporated into a wide variety of network components and configurations. The illustrated exemplary embodiments herein are provided only by way of explanation, not of limitation.

In the illustrated exemplary embodiment, each of a plurality of transmitters TX1, TX2 . . . TXN receives a data signal on an associated input port 108-1, 108-2 . . . 108-N, and transmits the data signal on associated wavelength $\lambda_1, \lambda_2 \ldots \lambda_N$. One or more of the transmitters TX1, TX2 . . . TXN may be configured to modulate data on the associated wavelength with using a PSK modulation format, such as POLMUX-QPSK. The transmitters, of course, are shown in highly simplified form for ease of explanation. Those skilled in the art will recognize that each transmitter may include electrical and optical components configured for transmitting the data signal at its associated wavelength with a desired amplitude and modulation.

The transmitted wavelengths or channels are respectively carried on a plurality of paths 110-1, 110-2 . . . 110-N. The data channels are combined into an aggregate signal on optical path 102 by a multiplexer or combiner 112. The optical information path 102 may include optical fiber waveguides, optical amplifiers, optical filters, dispersion compensating modules, and other active and passive components.

The aggregate signal may be received at one or more remote receiving terminals 106. A demultiplexer 114 separates the transmitted channels at wavelengths $\lambda_1, \lambda_2 \ldots \lambda_N$ onto associated paths 116-1, 116-2 . . . 116-N coupled to associated receivers RX1, RX2 . . . RXN. One or more of the receivers RX1, RX2 . . . RXN may be configured to demodulate the transmitted signal and provide an associated output data signal on an associated output path 118-1, 118-2, 118-3, 118-N.

Figure 2:
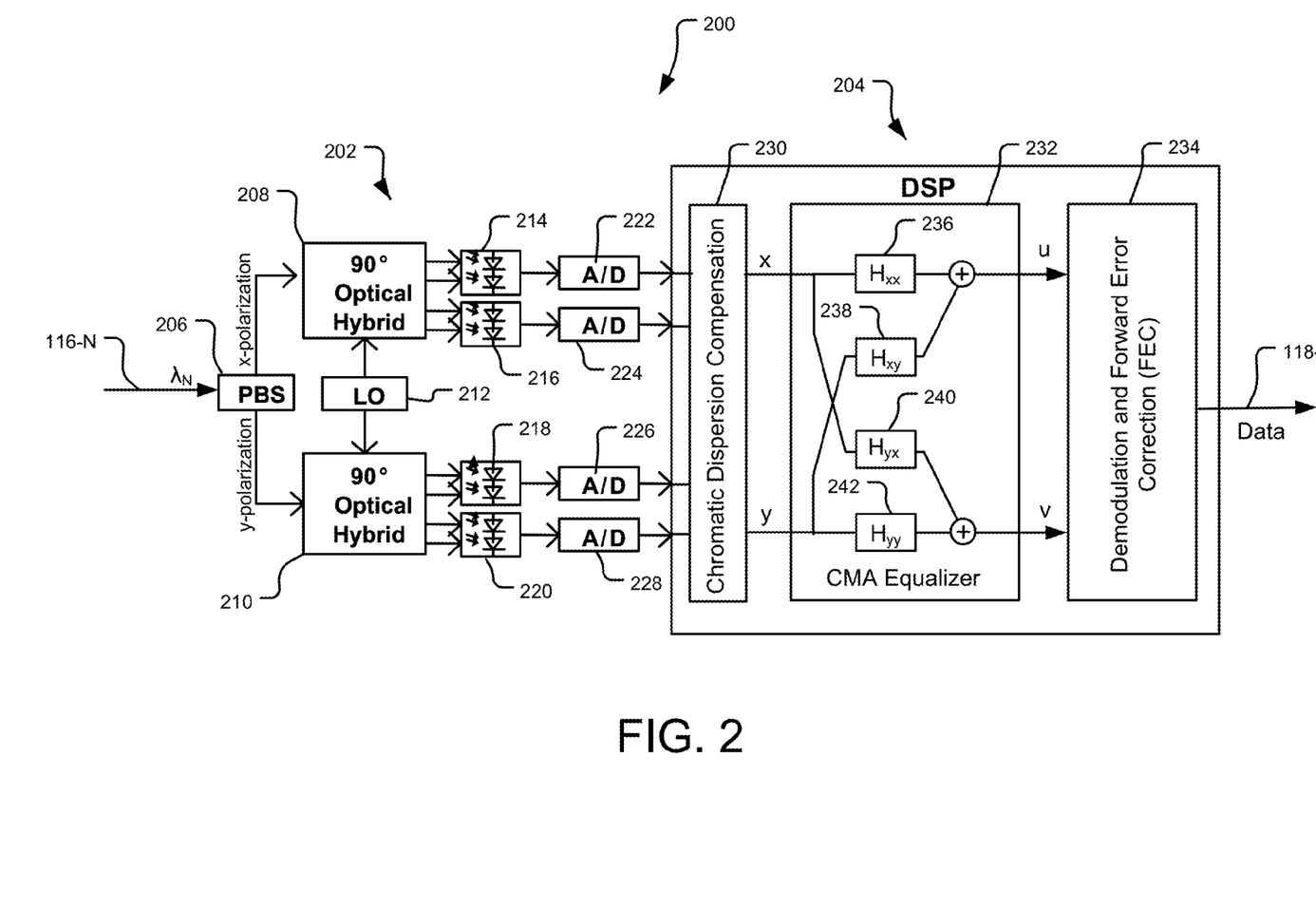
FIG. 2 is a block diagram of one exemplary embodiment of a receiver consistent with the present disclosure.

FIG. 2 is a simplified block diagram of one exemplary receiver 200 consistent with the present disclosure. The illustrated exemplary embodiment 200 includes a polarization-diversity coherent receiver configuration 202 for receiving an input signal on path 116-N and a digital signal processing (DSP) circuit 204 for processing the output of the coherent receiver to provide an output data signal on path 118-N. Data is modulated on the carrier wavelength of the optical input signal according to a POLMUX-PSK modulation format, such as POLMUX-QPSK. The coherent receiver 202 converts the received optical input signal into one or more digital signals that are coupled as inputs to the DSP circuit 204. The DSP circuit demodulates the data from the digital signals to provide an output data stream on path 118-N representative of the data modulated on the carrier wavelength $\lambda_N$.

The coherent receiver 202 may take a variety of configurations. In the illustrated exemplary embodiment, the receiver includes a polarization beam splitter (PBS) 206, first and second 90° optical hybrids 208, 210, a local oscillator (LO) 212, balanced detectors 214, 216, 218, 220 and analog-to-digital (A/D) converters 222, 224, 226, 228. The operations of these components in a coherent optical signal receiver are briefly described as follows. In general, orthogonal x- and y-polarizations of the input optical signal are split onto separate paths by the PBS 206. Each polarization is coupled to an associated 90° optical hybrid 208, 210. Each optical hybrid mixes its input signal with the four quadrilateral states of the LO oscillator signal in the complex-field space. Each optical hybrid then delivers the four mixed signals to two pairs of balanced detectors 214, 216, 218, 220. The outputs of the balanced detectors are converted to digital signals by the A/D converters 222, 224, 226, 228. The outputs of the A/D converters 222 and 224 may be designated as the I and Q outputs, respectively, for the x-polarization, and the outputs of the A/D converters 226 and 228 may be designated as the I and Q outputs, respectively, for the y-polarization.

The digital outputs of the A/D converters are coupled as inputs to the DSP circuit 204. In general, DSP involves processing of signals using one or more application specific integrated circuits (ASICS) and/or special purpose processors configured for performing specific instruction sequences, e.g. directly and/or under the control of software instructions. In the illustrated exemplary embodiment, the DSP circuit 204 is shown as including a chromatic dispersion compensation function 230, a CMA equalizer function 232, and a demodulation and forward error correction (FEC) function 234. These functions may be implemented in a variety of configurations using any combination of hardware, software and/or firmware. Although the functions are illustrated separately, it is to be understood that any one or more of the functions may be performed in a single integrated circuit or processor, or in a combination of integrated circuits and/or processors. Also, the integrated circuits and/or processors implementing the DSP functions may be shared among the illustrated functions in whole or in part.

The chromatic dispersion compensation function 230 receives the outputs of the A/D converters 222, 224, 226, 228. In a known manner, the chromatic dispersion function 230 may compensate for effects of chromatic dispersion imparted to the input signal. The chromatic dispersion function 230 may be implemented, for example, as a two distinct finite impulse response (FIR) filters, one of which performs compensation for the x-polarization using the outputs of the A/D converters 222 and 224 and the other of which performs compensation on the y-polarization using the outputs of the A/D converters 226, and 28. The chromatic dispersion compensation function provides a single output for the x-polarization (x in FIG. 2) and a single output for the y-polarization (y in FIG. 2), as shown. These outputs are supplied as inputs to the CMA equalizer function 232.

As will be discussed in greater detail, the CMA equalizer function 232 receives the compensated outputs x and y from the chromatic dispersion compensation function 230, and employs a coupling coefficient consistent with the present disclosure. The CMA function 232 compensates for PDL and PMD, and polarization de-multiplexes the x and y outputs to provide separate outputs u and v. The output u corresponds to the first polarization on which data was modulated at the transmitter, and the output v corresponds to the second polarization, orthogonal the first polarization, on which data was modulated at the transmitter. These outputs are supplied as inputs to the data demodulation and forward error correction function 234.

The data demodulation and forward error correction function 234 may include one or more known functions for demodulating PSK modulated data from the outputs u and v. In general, since the data in a PSK modulated signal is encoded in the phase of an optical carrier signal, demodulation of a PSK modulated signal in a DSP-based receiver may involve estimating and tracking the carrier phase. The data demodulation and forward error correction function 234 may thus include, for example, a local oscillator (LO) frequency offset compensation function, a carrier phase estimation (CPE) function, a bit decision function and forward error correction function, each of which may take a known configuration. The LO frequency offset compensation function may be configured to track and compensate for frequency offset between the received signal and the LO signal. The CPE function may be configured to estimate and track the phase of an optical carrier signal for performing demodulation. The carrier phase estimate from the CPE function may be coupled to a bit decision function which determines the data or bit values represented by the carrier phase in the modulated signals for each polarization. A known forward error correction function may be applied to the output of the bit decision function to improve bit error rate. The output of the data demodulation and forward error correction function 234 may thus be representative of the data modulated on the both polarizations of carrier wavelength $\lambda_N$ and may be coupled on an output on path 118-N.

As shown, the CMA equalizer function 232 includes sub-equalizers, 236, 238, 240, 242. In the illustrated embodiment, sub-equalizers 236 and 240 each receive as an input, the x-output of the chromatic dispersion compensation 230 function that corresponds to the x-polarization. Sub-equalizers 238 and 242 each receive as an input, the y-output of the chromatic dispersion compensation function 230 that corresponds to the y-polarization. The sub-equalizers 236, 238, 240, and 242 have transfer functions, $H_{xx}$, $H_{xy}$, $H_{yx}$ and $H_{yy}$, respectively. As shown, the outputs u and v of the CMA equalizer function 232, for any symbol k, are provided as:

$$u(k)=H_{xx}(k)x(k)+H_{xy}(k)y(k)$$

$$v(k)=H_{yx}(k)x(k)+H_{yy}(k)y(k) \quad (1)$$

Figure 3:
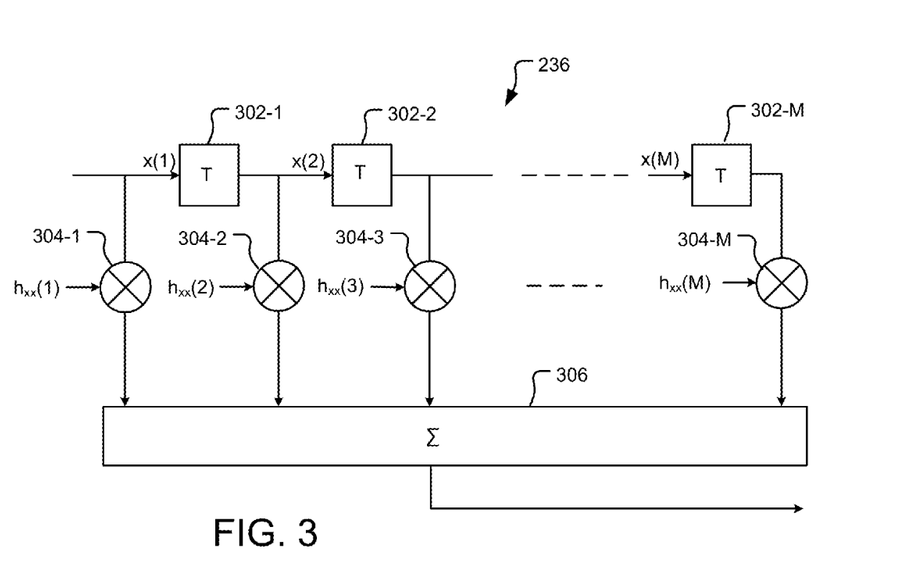
FIG. 3 is a block diagram of an exemplary embodiment of the $H_{xx}$ sub-equalizer shown in FIG. 2.

FIG. 3 is a block diagram illustrating one embodiment of a sub-equalizer 236 having transfer function $H_{xx}$. As shown, sub-equalizer 236 is a tapped delay equalizer, where M is the number of taps. The sub-equalizer includes delays 302 including delays 302-1, 302-2 . . . 302-M, multipliers 304 including multipliers 304-1, 304-2, 304-3 . . . 304-M, and a summer 306. The input signal to the sub-equalizer 236 is the output from the chromatic dispersion compensation function 230 corresponding to the x-polarization. Each of the multipliers 304-1, 304-2, 304-3 . . . 304-M receives a respective filter coefficient $h_{xx}(n)$, n=1 to M from a memory (not shown) and multiplies the filter coefficient by the value received from either the input signal or the associated one of the delays, as shown. The resulting tap weight products are summed by the summer 306 and the result is supplied as the output of the sub-equalizer 236. The output is provided continuously with the values of h (n) being updated as will be described below.

Figure 4:
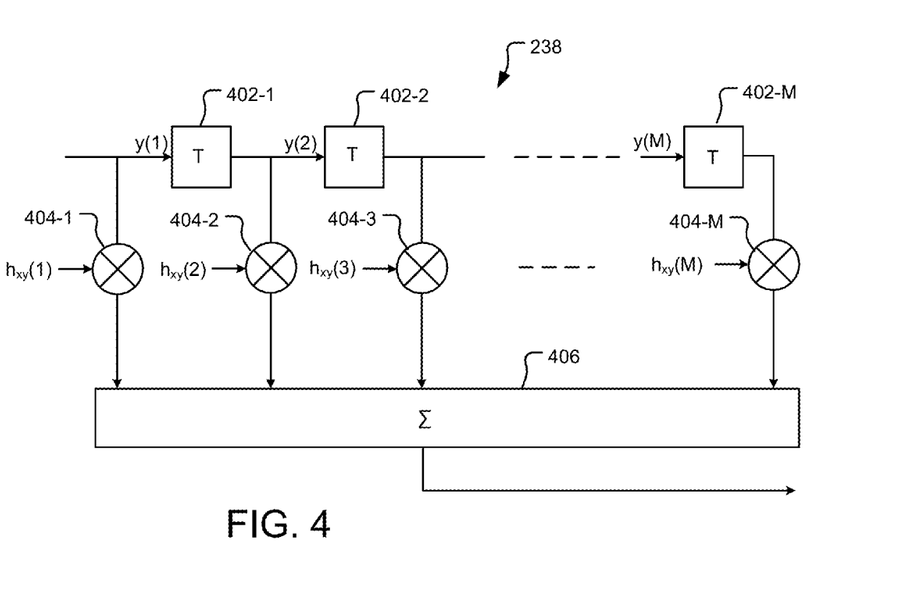
FIG. 4 is a block diagram of an exemplary embodiment of the $H_{xy}$ sub-equalizer shown in FIG. 2.

FIG. 4 is a block diagram illustrating one embodiment of a sub-equalizer 238 having transfer function $H_{xy}$. As shown, sub-equalizer 238 is a tapped delay equalizer, where M is the number of taps. The sub-equalizer includes delays 402 including delays 402-1, 402-2 . . . 402-M, multipliers 404 including multipliers 404-1, 404-2, 404-3 . . . 404-M, and a summer 406. The input signal to the sub-equalizer 238 is the output from the chromatic dispersion compensation function 230 corresponding to the y-polarization. Each of the multipliers 404-1, 404-2, 404-3 . . . 404-M receives a respective filter coefficient $h_{xy}(n)$, n=1 to M from a memory (not shown) and multiplies the filter coefficient by the value received from either the input signal or the associated one of the delays, as shown. The resulting tap weight products are summed by the summer 406 and the result is supplied as the output of the sub-equalizer 238. The output is provided continuously with the values of $h_{xy}(n)$ being updated as will be described below.

Figure 5:
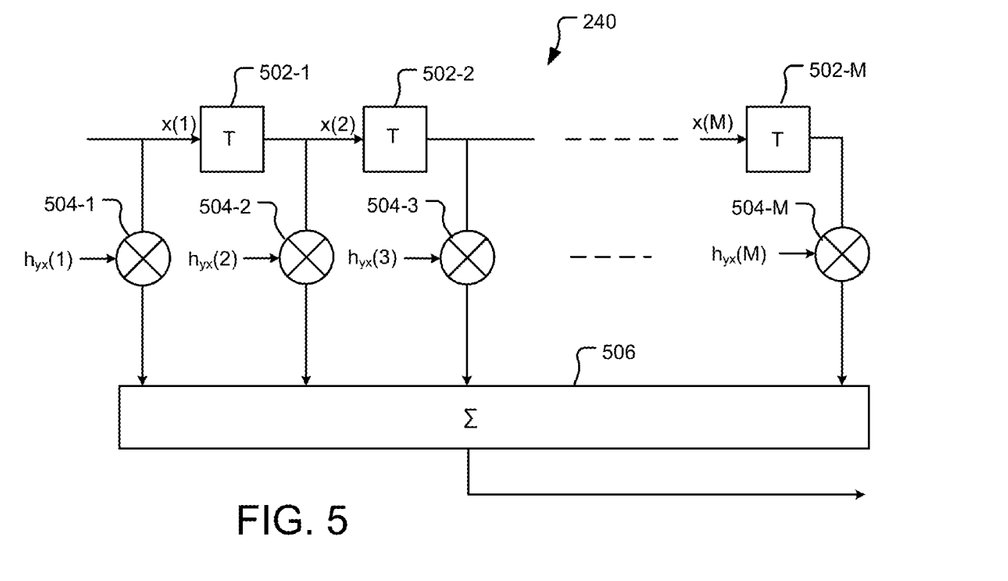
FIG. 5 is a block diagram of an exemplary embodiment of the $H_{yx}$ sub-equalizer shown in FIG. 2.

FIG. 5 is a block diagram illustrating one embodiment of a sub-equalizer 240 having transfer function $H_{yx}$. As shown, sub-equalizer 240 is a tapped delay equalizer, where M is the number of taps. The sub-equalizer includes delays 502 including delays 502-1, 502-2 . . . 502-M, multipliers 504 including multipliers 504-1, 504-2, 504-3 . . . 504-M, and a summer 506. The input signal to the sub-equalizer 240 is the output from the chromatic dispersion compensation function 230 corresponding to the x-polarization. Each of the multipliers 504-1, 504-2, 504-3 . . . 504-M receives a respective filter coefficient $h_{yx}(n)$, n=1 to M from a memory (not shown) and multiplies the filter coefficient by the value received from either the input signal or the associated one of the delays, as shown. The resulting tap weight products are summed by the summer 506 and the result is supplied as the output of the sub-equalizer 240. The output is provided continuously with the values of $h_{yx}(n)$ being updated as will be described below.

Figure 6:
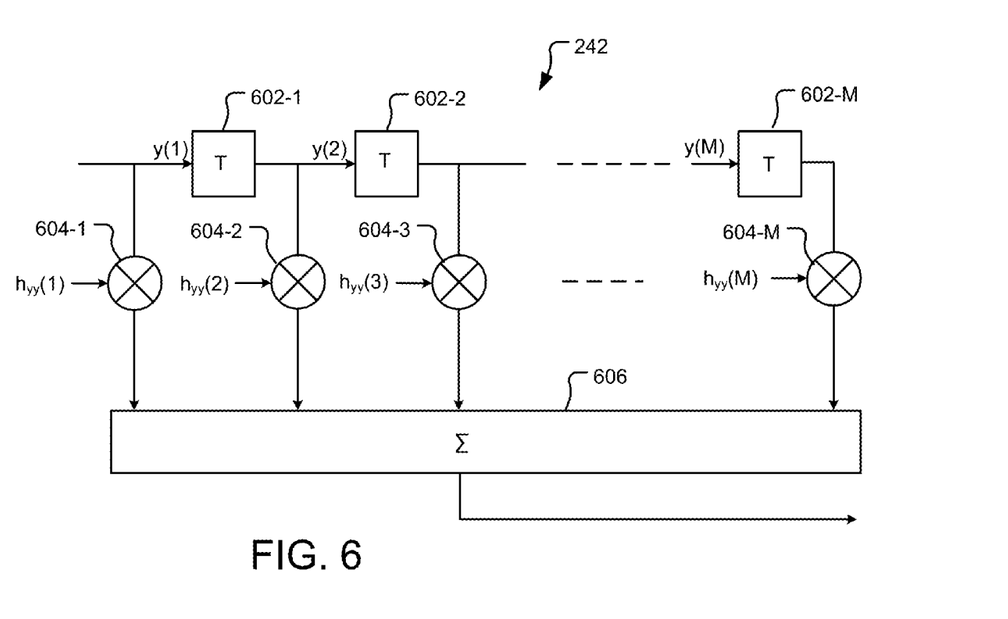
FIG. 6 is a block diagram of an exemplary embodiment of the $H_{yy}$ sub-equalizer shown in FIG. 2.

FIG. 6 is a block diagram illustrating one embodiment of a sub-equalizer 242 having transfer function $H_{yy}$. As shown, sub-equalizer 242 is a tapped delay equalizer, where M is the number of taps. The sub-equalizer includes delays 602 including delays 602-1, 602-2 . . . 602-M, multipliers 604 including multipliers 604-1, 604-2, 604-3 . . . 604-M, and a summer 606. The input signal to the sub-equalizer 242 is the output from the chromatic dispersion compensation function 230 corresponding to the y-polarization. Each of the multipliers 604-1, 604-2, 604-3 . . . 604-M receives a respective filter coefficient $h_{yy}(n)$, n=1 to M from a memory (not shown) and multiplies the filter coefficient by the value received from either the input signal or the associated one of the delays, as shown. The resulting tap weight products are summed by the summer 606 and the result is supplied as the output of the sub-equalizer 242. The output is provided continuously with the values of $h_{yy}(n)$ being updated as will be described below.

Consistent with the present disclosure, to avoid convergence of the CMA, the filter coefficients of the sub-equalizers, 236, 238, 240 and 242 are updated using a modified CMA incorporating a coupling coefficient. Although the system may be configured to provide one input signal sample per coefficient update cycle, so that updates to the coefficients occur for each input signal sample, any number of input signal samples may be incorporated into a coefficient updated cycle. In general, in a system consistent with the present disclosure, the filter coefficients for one of the sub-equalizers may be calculated to be the sum of a first component and a second component. The first component may be calculated using the previous filter coefficient and an update gradient for the sub-equalizer and may be modified by a function of the coupling coefficient. The second component may be calculated using a filter coefficient and an update gradient of another sub-equalizer and may be modified by a function of the coupling coefficient. In one embodiment, for example, the coupling coefficients may be calculated as: For n=1, 2 ... M $$h_{xx}(n,k+1)=(1-\mu)(h_{xx}(n,k)+\Delta h_{xx}(n,k))+\mu(h_{yy}(M+1-n,k)+\Delta h_{yy}(M+1-n,k))^*$$

$$h_{yy}(n,k+1)=(1-\mu)(h_{yy}(n,k)+\Delta h_{yy}(n,k))+\mu(h_{xx}(M+1-n,k)+\Delta h_{xx}(M+1-n,k))^*$$

$$h_{xy}(n,k+1)=(1-\mu)(h_{xy}(n,k)+\Delta h_{xy}(n,k))+\mu(h_{yx}(M+1-n,k)+\Delta h_{yx}(M+1-n,k))^*$$

$$h_{yx}(n,k+1)=(1-\mu)(h_{yx}(n,k)+\Delta h_{yx}(n,k))+\mu(h_{xy}(M+1-n,k)+\Delta h_{xy}(M+1-n,k))^* \quad (2)$$

where, M is the number of taps/multipliers in the sub-equalizer, k is the current update cycle, k+1 is the next update cycle, $\mu$ is the coupling coefficient, the superscript * means complex conjugation. The update gradients $\Delta h_{xx}$, $\Delta h_{yy}$, $\Delta h_{xy}$, $\Delta h_{yx}$ may be calculated as:

$$\Delta h_{xx}(k)=\epsilon(1-|u(k)|^2)u(k)x^*(k)$$

$$\Delta h_{yy}(k)=\epsilon(1-|v(k)|^2)v(k)y^*(k)$$

$$\Delta h_{xy}(k)=\epsilon(1-|u(k)|^2)u(k)y^*(k)$$

$$\Delta h_{yx}(k)=\epsilon(1-|v(k)|^2)v(k)x^*(k) \quad (3)$$

where $\epsilon$ is the step size, e.g., $10^{-3}$.

Convergence of a CMA using a coupling coefficient consistent with the present disclosure may be avoided as long as the coupling coefficient $\mu$ is greater than zero. In general, the value of the coupling coefficient $\mu$ should be between 0 and 1. However, it has been discovered that performance penalties are smallest with a very weak coupling coefficient $\mu$, such that $\mu \leq 10^{-2}$.

Figure 7:
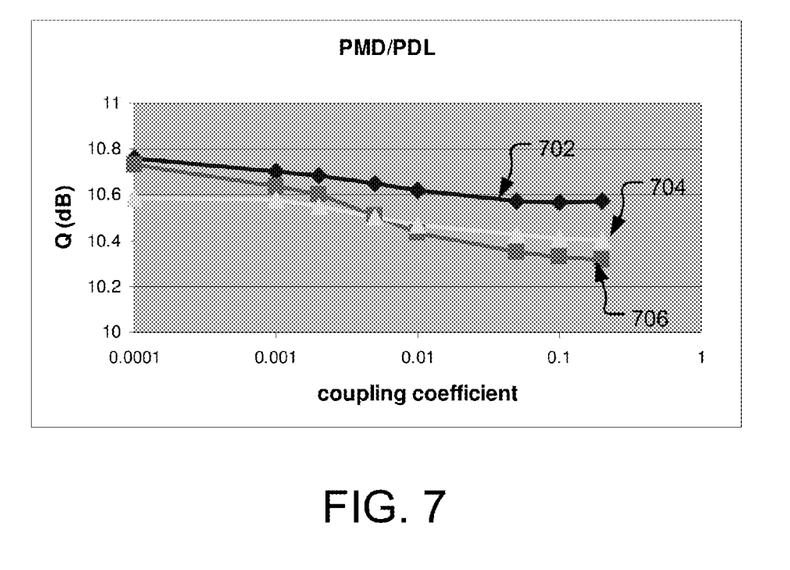
FIG. 7 is a plot of coupling coefficient vs. Q performance illustrating performance of a system and method consistent with the present disclosure wherein the transmission line imparts PMD and PDL.

FIG. 7 includes measured plots 702, 704, 706 of system Q (dB) vs. coupling coefficient for a system including a transmitter for modulating data using a POLMUX-QPSK modulation format, a transmission path that imparts PMD and PDL, and receiver configured as illustrated in FIG. 3 including a CMA equalizer with a coupling coefficient consistent with the present disclosure. Each plot 702, 704, 706 is associated with a different independent transmission of data on the system. As shown, system performance, i.e. Q, is optimized for very weak coupling coefficient values approaching but not equal to zero. In the illustrated embodiment, Q above 10.4 dB was achieved for coupling coefficients of $0 \leq \mu \leq 10^{-2}$, with the best performance achieved using a coupling coefficient of $\mu=10^{-4}$.

Figure 8:
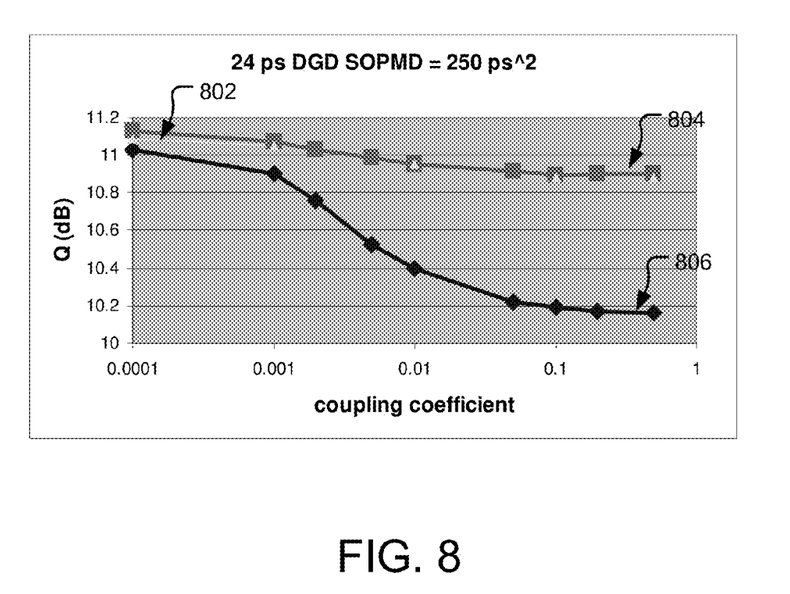
FIG. 8 is a plot of coupling coefficient vs. Q performance illustrating performance of a system and method consistent with the present disclosure wherein the transmission line imparts 24 ps differential group delay (DGD) and a second order PMD (SOPMD) of 250 $ps^2$.

FIG. 8 includes measured plots 802, 804, 806 of system Q (dB) vs. coupling coefficient for a system including a transmitter for modulating data using a POLMUX-QPSK modulation format, a transmission path that imparts a first order PMD with 24 ps differential group delay (DGD) and second order PMD of 250 ps², and receiver configured as illustrated in FIG. 3 including CMA equalizer with a coupling coefficient consistent with the present disclosure. Each plot 802, 804, 806 is associated with a different independent transmission of data on the system. Again, as shown, system performance, i.e. Q, is optimized for very weak coupling coefficient values approaching but not equal to zero. In the illustrated embodiment, Q above 10.4 dB was achieved for coupling coefficients of $0 \leq \mu \leq 10^{-2}$. Again, the best performance is achieved using a coupling coefficient of $\mu=10^{-4}$.

Figure 9:
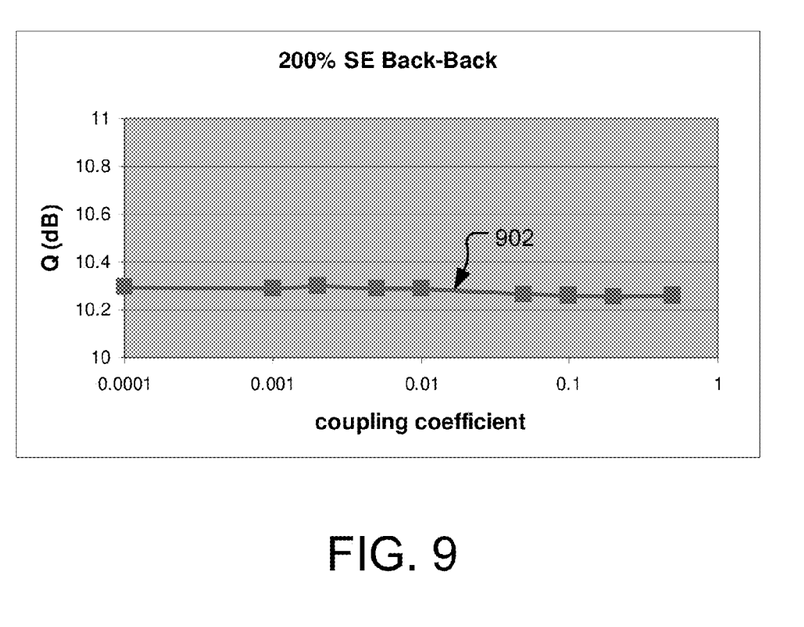
FIG. 9 is a plot of coupling coefficient vs. Q performance illustrating performance of a system and method consistent with the present disclosure wherein the system is configured with 200% spectral efficiency in a back-to-back transmission.

For comparison, FIG. 9 includes a measured plot 902 of system Q (dB) vs. coupling coefficient for a system including a transmitter for modulating data using a POLMUX-QPSK modulation format and receiver configured as illustrated in FIG. 3 including CMA equalizer with a coupling coefficient consistent with the present disclosure, but with the transmitter and receiver in back-to-back configuration, i.e. with only a very short transmission path that produces essentially no PDL or PMD. As shown, system performance, i.e. Q, is substantially constant at about 10.3 dB for values of the coupling coefficient between 1 and $10^{-4}$. Comparing FIGS. 7 and 8 to FIG. 9, it is clear that a system consistent with the present disclosure using a weak coupling coefficient, e.g. of about $0 \leq \mu \leq 10^{-2}$ achieves improved system Q performance in the presence of PMD and PDL.

Optimization of the coupling coefficient can be achieved in a system consistent with the present disclosure by evaluating the determinant of the CMA matrix, e.g. within the DSP 204. In the frequency domain the determinant of the CMA matrix is given as $$\left\| \begin{matrix} H_{xx}(w) & H_{xy}(w) \\ H_{yx}(w) & H_{yy}(w) \end{matrix} \right\| = H_{xx}(w)H_{yy}(w) - H_{xy}(w)H_{yx}(w) \quad (4)$$

where $H_{xx}(w)$, $H_{xy}(w)$, $H_{yy}(w)$, $H_{yx}(w)$ are the Fourier transfer function of the CMA filter coefficients $h_{xx}(n)$, $h_{xy}(n)$, $h_{yy}(n)$, $h_{yx}(n)$, n=1, 2, ..., M The determinant may be calculated at w=0. And $$H_{xx}(0) = \sum_{n=1}^{M} h_{xx}(n)$$

$$H_{xy}(0) = \sum_{n=1}^{M} h_{xy}(n),$$

$$H_{yy}(0) = \sum_{n=1}^{M} h_{yy}(n)$$

$$H_{yx}(0) = \sum_{n=1}^{M} h_{yx}(n)$$

To normalize the value of the determinant between 0 and 1, a normalization factor may be calculated as:

$$0.25 \left\| \begin{matrix} H_{xx}(0) + H_{yy}^*(0) & H_{xy}(0) - H_{yx}^*(0) \\ H_{yx}(0) - H_{xy}^*(0) & H_{xx}^*(0) + H_{yy}(0) \end{matrix} \right\| \quad (5)$$

The normalized determinant can thus be calculated as:

$$|H| = 4 \frac{\left\| \begin{matrix} H_{xx}(0) & H_{xy}(0) \\ H_{yx}(0) & H_{yy}(0) \end{matrix} \right\|}{\left\| \begin{matrix} H_{xx}(0) + H_{yy}^*(0) & H_{xy}(0) - H_{yx}^*(0) \\ H_{yx}(0) - H_{xy}^*(0) & H_{yy}(0) + H_{xx}^*(0) \end{matrix} \right\|} \quad (6)$$

In general, convergence of the CMA occurs when the value of the determinant |H| is equal to zero. To optimize performance, the coupling coefficient may be set to ensure the normalized determinant |H| remains above a predetermined threshold. In one embodiment, for example, the coupling coefficient may be initially set to zero and the DSP may continuously calculate the normalized determinant |H|. When the normalized determinant |H| falls below a predetermined threshold, the coupling coefficient may be increased to cause a corresponding increase in the value of the normalized determinant |H| to move the value of the normalized determinant |H| above the predetermined threshold. In one embodiment, the predetermined threshold may be set to a value between 0.5 and 1.0. Once the normalized determinant |H| is above the threshold, the coupling coefficient may be reset to a zero. The coupling coefficient may thus be dynamically adjusted in response to the determinant to continuously avoid convergence while maintaining strong Q performance.

Figure 10:
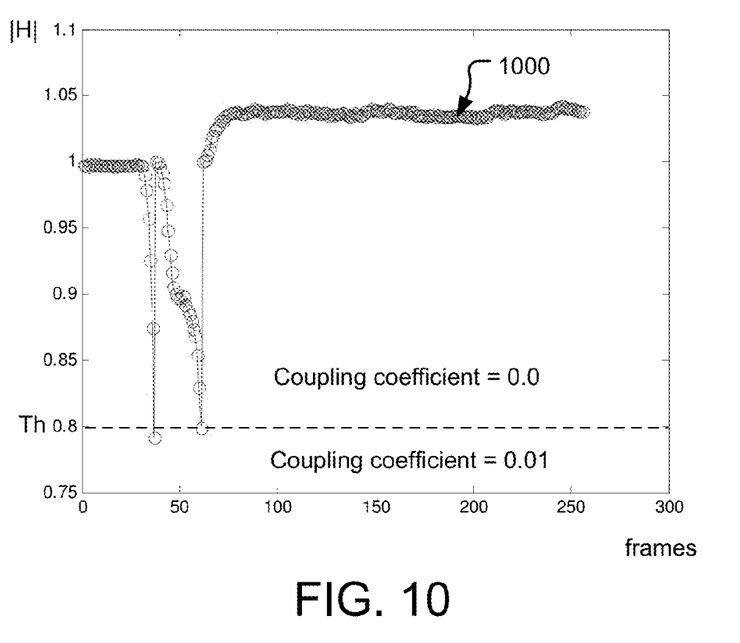
FIG. 10 is a plot of normalized CMA matrix determinant value vs. data sample (frames) illustrating adjustment of a coupling coefficient consistent with the present disclosure.

FIG. 10, for example, includes a simulated plot 100 of the calculated value of the normalized determinant |H| vs. the data samples (frames) in the DSP. In the illustrated embodiment, the threshold value of the normalized determinant |H| was set to a value of 0.8. As shown, while the value of the normalized determinant |H| was above the threshold of 0.8 the coupling coefficient was set to zero. However, when the value of the normalized determinant |H| dropped below the threshold of 0.8, the coupling coefficient was set to 0.01, which returned the value of the normalized determinant |H| above the 0.8 threshold.

Figure 11:
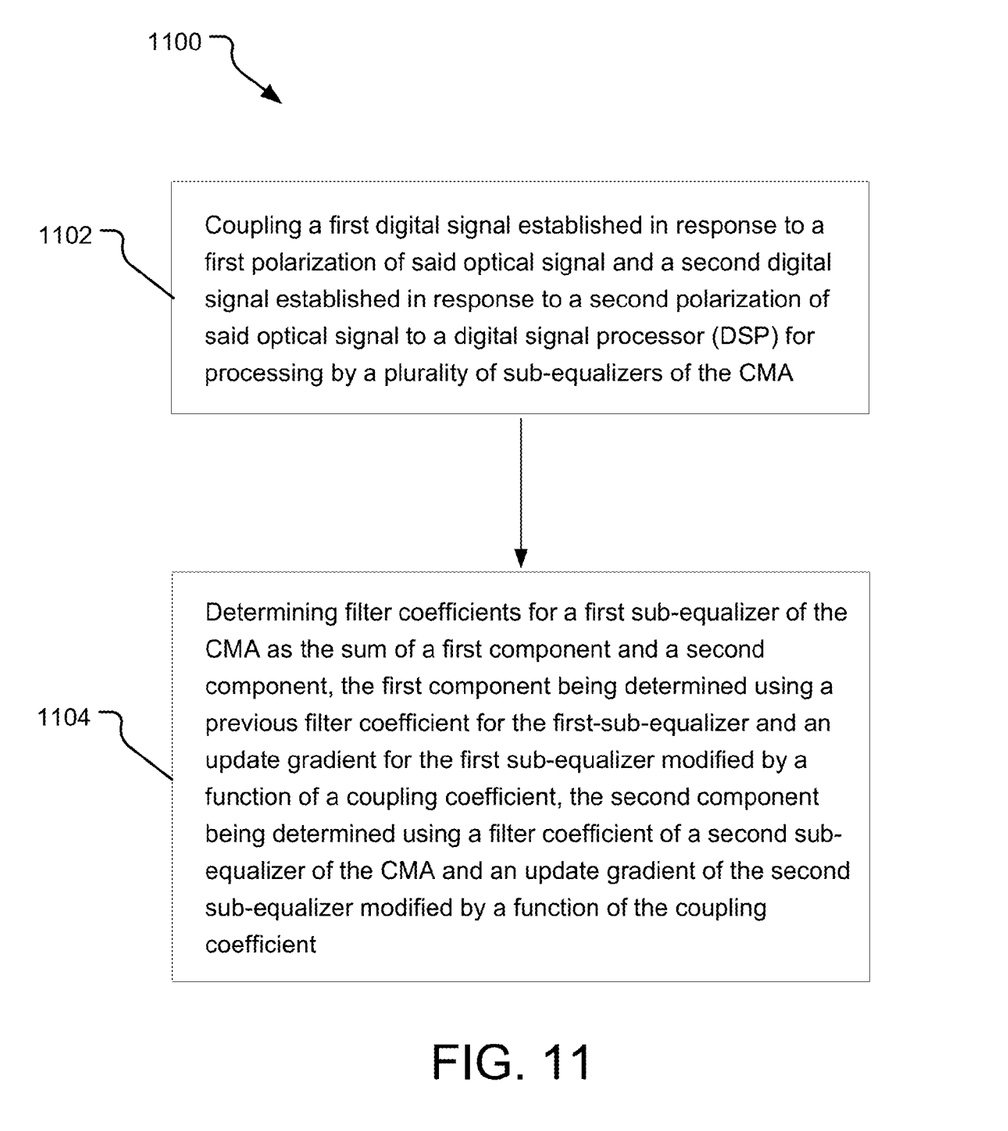
FIG. 11 is flow chart illustrating one example of a method consistent with the present disclosure.

FIG. 11 is a flow chart illustrating a method 1100 of demodulating a polarization multiplexed optical signal consistent with the present disclosure. Operation 1102 includes coupling a first digital signal established in response to a first polarization of the optical signal and a second digital signal established in response to a second polarization of the optical signal to a digital signal processor (DSP) for processing by a plurality of sub-equalizers of the CMA. In operation 1104 filter coefficients for a first sub-equalizer of the CMA are determined as the sum of a first component and a second component. The first component is determined using a previous filter coefficient for the first-sub-equalizer and an update gradient for the first sub-equalizer modified by a function of a coupling coefficient. The second component is determined using a filter coefficient of a second sub-equalizer of the CMA and an update gradient of the second sub-equalizer modified by a function of the coupling coefficient.

While FIG. 11 illustrates various operations according to an embodiment, it is to be understood that not all of the operations depicted in FIG. 11 are necessary for other embodiments. Indeed, it is fully contemplated herein that in other embodiments of the present disclosure, the operations depicted in FIG. 11, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

According to one aspect of the disclosure, there is provided an optical receiver system including: a coherent receiver for receiving a polarization multiplexed optical signal and providing a first plurality of outputs in response to a first polarization of the optical signal and a second plurality of outputs in response to a second polarization of the optical signal; and a digital signal processor (DSP) configured to apply a modified constant modulus algorithm (CMA) to a first digital signal established in response to the first plurality of outputs and a second digital signal established in response to the second plurality of outputs to provide first and second digital outputs representative of a first polarization state of the optical signal at which data is modulated and a second polarization state of the optical signal at which data is modulated. The modified CMA includes a plurality of sub-equalizer filters, each of the sub-equalizer filters includes a plurality of delays for producing successively delayed versions of the input signal and a plurality of multipliers, each of the multipliers multiplying the input signal or an associated one of the delayed versions of the input signal with an associated filter coefficient to produce an associated tap weight product, the tap weight products being summed to provide an output for the equalizer. The plurality of sub-equalizers includes a first sub-equalizer and a second sub-equalizer, each of the filter coefficients for the first sub-equalizer is determined by the modified CMA as the sum of a first component and a second component. The first component is determined using a previous filter coefficient for the first-sub-equalizer and an update gradient for the first sub-equalizer modified by a function of a coupling coefficient. The second component is determined using a filter coefficient of the second sub-equalizer and an update gradient of the second sub-equalizer modified by a function of the coupling coefficient.

According to another aspect of the disclosure, there is provided an optical communication system including: a transmitting terminal for transmitting a plurality of optical signals, each at a different associated wavelength, on an optical information path, at least one of the optical signals being a polarization multiplexed phase shift keying (PSK) signal having data modulated thereon according to a phase shift keying modulation format; and an optical receiver system coupled to the optical information path for receiving the at least one of the plurality of optical signals. The optical receiver system includes: a coherent receiver for receiving the at least one of the plurality of optical signals and providing a first plurality of outputs in response to a first polarization of the at least one of the plurality of optical signals and a second plurality of outputs in response to a second polarization of the at least one of the plurality of optical signals, and a digital signal processor (DSP) configured to apply a modified constant modulus algorithm (CMA) to a first digital signal established in response the first plurality of outputs and a second digital signal established in response to the second plurality of outputs to provide first and second digital outputs representative of a first polarization state of the at least one of the plurality of optical signals on which the data is modulated and a second polarization state of the at least one of the plurality of optical signals on which the data is modulated. The modified CMA includes a plurality of sub-equalizer filters, each of the sub-equalizer filters includes a plurality of delays for producing successively delayed versions of the input signal and a plurality of multipliers, each of the multipliers multiplying the input signal or an associated one of the delayed versions of the input signal with an associated filter coefficient to produce an associated tap weight product, the tap weight products being summed to provide an output for the equalizer. The plurality of sub-equalizers includes a first sub-equalizer and a second sub-equalizer, each of the filter coefficients for the first sub-equalizer is determined by the modified CMA as the sum of a first component and a second component. The first component is determined using a previous filter coefficient for the first-sub-equalizer and an update gradient for the first sub-equalizer modified by a function of a coupling coefficient. The second component is determined using a filter coefficient of the second sub-equalizer and an update gradient of the second sub-equalizer modified by a function of the coupling coefficient, wherein the coupling coefficient has a value greater than zero and less than one.

According to another aspect of the present disclosure, there is provided a method of demodulating a polarization multiplexed optical signal using a constant modulus algorithm (CMA) without convergence of the outputs of the CMA. The method includes: coupling a first digital signal established in response to a first polarization of the optical signal and a second digital signal established in response to a second polarization of the optical signal to a digital signal processor (DSP) for processing by a plurality of sub-equalizers of the CMA; and determining filter coefficients for a first sub-equalizer of the CMA as the sum of a first component and a second component, the first component being determined using a previous filter coefficient for the first-sub-equalizer and an update gradient for the first sub-equalizer modified by a function of a coupling coefficient, the second component being determined using a filter coefficient of a second sub-equalizer of the CMA and an update gradient of the second sub-equalizer modified by a function of the coupling coefficient.

Embodiments of the methods described herein may be implemented using a processor and/or other programmable device, such as the DSP 204. To that end, the methods described herein may be implemented on a tangible, non-transitory computer readable medium having instructions stored thereon that when executed by one or more processors perform the methods. Thus, for example, the DSP 204 may include a storage medium (not shown) to store instructions (in, for example, firmware or software) to perform the operations described herein. The storage medium may include any type of tangible medium, for example, any type of disk including floppy disks, optical disks, compact disk read-only memories (CD-ROMs), compact disk re-writables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

As used in any embodiment herein, "circuitry" may comprise, for example, singly or in any combination, hardwired circuitry, programmable circuitry, state machine circuitry, and/or firmware that stores instructions executed by programmable circuitry. In at least one embodiment, the DSP 204 may comprise one or more integrated circuits. An "integrated circuit" may be a digital, analog or mixed-signal semiconductor device and/or microelectronic device, such as, for example, but not limited to, a semiconductor integrated circuit chip.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An optical receiver system comprising:
a coherent receiver for receiving a polarization multiplexed optical signal and providing a first plurality of outputs in response to a first polarization of said optical signal and a second plurality of outputs in response to a second polarization of said optical signal; and
a digital signal processor (DSP) configured to apply a modified constant modulus algorithm (CMA) to a first digital signal established in response to said first plurality of outputs and a second digital signal established in response to said second plurality of outputs to provide first and second digital outputs representative of a first polarization state of said optical signal at which data is modulated and a second polarization state of said optical signal at which data is modulated,
said modified CMA comprising a plurality of sub-equalizer filters, each of said sub-equalizer filters comprising a plurality of delays for producing successively delayed versions of said input signal and a plurality of multipliers, each of said multipliers multiplying said input signal or an associated one of said delayed versions of said input signal with an associated filter coefficient to produce an associated tap weight product, said tap weight products being summed to provide an output for said equalizer,
said plurality of sub-equalizers comprising a first sub-equalizer and a second sub-equalizer, each of said filter coefficients for said first sub-equalizer being determined by said modified CMA as the sum of a first component and a second component,
said first component being determined using a previous filter coefficient for said first-sub-equalizer and an update gradient for said first sub-equalizer modified by a function of a coupling coefficient,
said second component being determined using a filter coefficient of said second sub-equalizer and an update gradient of said second sub-equalizer modified by a function of said coupling coefficient.

2. An optical receiver system according to claim 1, wherein said coupling coefficient has a value greater than zero and less than one.

3. An optical receiver system according to claim 1, wherein said coupling coefficient is $10^{-2}$ or less.

4. An optical receiver system according to claim 1, wherein said coupling coefficient is adjusted in response to the value of a determinant of a CMA matrix.

5. An optical receiver system according to claim 4, wherein said coupling coefficient is increased when said value of said determinant decreases below a threshold.

6. An optical receiver system according to claim 5, wherein said coupling coefficient is increased to a value of $10^{-2}$ or less.

7. An optical receiver system according to claim 5, wherein said determinant is normalized such that said value is between 0 and 1, and wherein said threshold is between 0.5 and 1.0.

8. An optical receiver system according to claim 1, wherein said filter coefficients for said first sub-equalizer are calculated according to the following equation:

$$h_{xx}(n,k+1)=(1-\mu)(h_{xx}(n,k)+\Delta h_{xx}(n,k))+\mu(h_{yy}(M+1-n,k)+\Delta h_{yy}(M+1-n,k)))^*$$

for n=1 to M, where M is the number of said multipliers in each of said sub-equalizers, k is a current update cycle, k+1 is a next update cycle, $\mu$ is the coupling coefficient, the superscript * means complex conjugation, $\Delta h_{xx}$ designates said updated gradient for said first sub-equalizer, $h_{yy}$ designates said filter coefficient of said second sub-equalizer and $\Delta h_{yy}$ designates said update gradient of said second sub-equalizer.

9. An optical receiver system according to claim 8, wherein said update gradient of said first and second sub-equalizers are calculated according to the following equation:

$$\Delta h_{xx}(k)=\epsilon(1-|u(k)|^2)u(k)x^*(k)$$

$$\Delta h_{yy}(k)=\epsilon(1-|v(k)|^2)v(k)y^*(k)$$

where u(k) is said first digital output, v(k) is said second digital output, and $\epsilon$ is a step size.

10. An optical communication system comprising:
a transmitting terminal for transmitting a plurality of optical signals, each at a different associated wavelength, on an optical information path, at least one of the optical signals being a polarization multiplexed phase shift keying (PSK) signal having data modulated thereon according to a phase shift keying modulation format; and
an optical receiver system coupled to the optical information path for receiving said at least one of the plurality of optical signals, said optical receiver system comprising:
a coherent receiver for receiving said at least one of the plurality of optical signals and providing a first plurality of outputs in response to a first polarization of said at least one of the plurality of optical signals and a second plurality of outputs in response to a second polarization of said at least one of the plurality of optical signals, and
a digital signal processor (DSP) configured to apply a modified constant modulus algorithm (CMA) to a first digital signal established in response said first plurality of outputs and a second digital signal established in response to said second plurality of outputs to provide first and second digital outputs representative of a first polarization state of said at least one of the plurality of optical signals on which said data is modulated and a second polarization state of said at least one of the plurality of optical signals on which said data is modulated, said modified CMA comprising a plurality of sub-equalizer filters, each of said sub-equalizer filters comprising a plurality of delays for producing successively delayed versions of said input signal and a plurality of multipliers, each of said multipliers multiplying said input signal or an associated one of said delayed versions of said input signal with an associated filter coefficient to produce an associated tap weight product, said tap weight products being summed to provide an output for said equalizer,
said plurality of sub-equalizers comprising a first sub-equalizer and a second sub-equalizer, each of said filter coefficients for said first sub-equalizer being determined by said modified CMA as the sum of a first component and a second component,
said first component being determined using a previous filter coefficient for said first-sub-equalizer and an update gradient for said first sub-equalizer modified by a function of a coupling coefficient,
said second component being determined using a filter coefficient of said second sub-equalizer and an update gradient of said second sub-equalizer modified by a function of said coupling coefficient, wherein said coupling coefficient has a value greater than zero and less than one.

11. An optical communication system according to claim 10, wherein said coupling coefficient is $10^{-2}$ or less.

12. A method of demodulating a polarization multiplexed optical signal using a constant modulus algorithm (CMA) without convergence of the outputs of the CMA, said method comprising:
coupling a first digital signal established in response to a first polarization of said optical signal and a second digital signal established in response to a second polarization of said optical signal to a digital signal processor (DSP) for processing by a plurality of sub-equalizers of the CMA; and
determining filter coefficients for a first sub-equalizer of the CMA as the sum of a first component and a second component,
said first component being determined using a previous filter coefficient for said first-sub-equalizer and an update gradient for said first sub-equalizer modified by a function of a coupling coefficient,
said second component being determined using a filter coefficient of a second sub-equalizer of the CMA and an update gradient of said second sub-equalizer modified by a function of said coupling coefficient.

13. A method according to claim 12, wherein said coupling coefficient has a value greater than zero and less than one.

14. A method according to claim 12, wherein said coupling coefficient is $10^{-2}$ or less.

15. A method according to claim 12, said method further comprising adjusting said coupling coefficient in response to the value of a determinant of a CMA matrix.

16. A method according to claim 15, wherein said adjusting said coupling coefficient comprises increasing said coupling coefficient when said value of said determinant decreases below a threshold.

17. A method according to claim 16, wherein coupling coefficient is increased to a value of $10^{-2}$ or less.

18. A method according to claim 16, wherein said determinant is normalized such that said value is between 0 and 1, and wherein said threshold is between 0.5 and 1.0.

19. A method according to claim 12, wherein said determining said filter coefficients comprises calculating said filter coefficients according to the following equation:

$$h_{xx}(n,k+1)=(1-\mu)(h_{xx}(n,k)+\Delta h_{xx}(n,k))+\mu(h_{yy}(M+1-n,k)+\Delta h_{yy}(M+1-n,k))^*$$

for n=1 to M, where M is the number of said multipliers in each of said sub-equalizers, k is a current update cycle, k+1 is a next update cycle, $\mu$ is the coupling coefficient, the superscript * means complex conjugation, $\Delta h_{xx}$ designates said updated gradient for said first sub-equalizer, $h_{yy}$ designates said filter coefficient of said second sub-equalizer and $\Delta h_{yy}$ designates said update gradient of said second sub-equalizer.

20. A method according to claim 19, wherein said update gradient of said first and second sub-equalizers are calculated according to the following equation:

$$\Delta h_{xx}(k)=\epsilon(1-|u(k)|^2)u(k)x^*(k)$$

$$\Delta h_{yy}(k)=\epsilon(1-|v(k)|^2)v(k)y^*(k)$$

where u(k) is said first digital output, v(k) is said second digital output, and $\epsilon$ is a step size.

\* \* \* \* \*